(12) United States Patent
Iyengar et al.

(10) Patent No.: US 12,361,681 B2
(45) Date of Patent: Jul. 15, 2025

(54) ASYNCHRONOUSLY UPDATING OBJECT DETECTIONS WITHIN A VIDEO STREAM

(71) Applicant: Microsoft Technology Licensing, LLC, Redmond, WA (US)

(72) Inventors: Srinivasan Iyengar, Bangalore (IN); Venkata N. Padmanabhan, Bengaluru (IN); Anuj Rathore, Bengaluru (IN); Anurag Ghosh, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/862,292

(22) PCT Filed: Apr. 5, 2023

(86) PCT No.: PCT/US2023/017645
§ 371 (c)(1),
(2) Date: Nov. 1, 2024

(87) PCT Pub. No.: WO2023/215067
PCT Pub. Date: Nov. 9, 2023

(65) Prior Publication Data
US 2025/0118051 A1 Apr. 10, 2025

(30) Foreign Application Priority Data
May 3, 2022 (IN) .............................. 202241025789

(51) Int. Cl.
 *G06V 10/764* (2022.01)
 *G06F 9/50* (2006.01)
 (Continued)

(52) U.S. Cl.
 CPC .......... *G06V 10/764* (2022.01); *G06V 10/809* (2022.01); *G06V 20/50* (2022.01);
 (Continued)

(58) Field of Classification Search
 CPC .... G06V 10/764; G06V 10/809; G06V 20/50; G06V 30/24; G06V 30/30; G06V 40/00; G06F 9/50; G06N 3/00
 See application file for complete search history.

(56) References Cited

U.S. PATENT DOCUMENTS

| | | | |
|---|---|---|---|
| 2021/0264619 A1* | 8/2021 | Grancharov | G06T 19/006 |
| 2021/0271912 A1* | 9/2021 | Wu | G06N 3/08 |
| 2023/0252649 A1* | 8/2023 | Lu | G06V 10/62 |
| | | | 382/103 |

OTHER PUBLICATIONS

Du, Kuntai, et al. "Server-driven video streaming for deep learning inference." Proceedings of the Annual conference of the ACM Special Interest Group on Data Communication on the applications, technologies, architectures, and protocols for computer communication. 2020.*

(Continued)

*Primary Examiner* — Ross Varndell
(74) *Attorney, Agent, or Firm* — Workman Nydegger

(57) ABSTRACT

Asynchronously updating object detections within a video stream. A first set of objects associated a first frame include a first object detected by a first detection model. Object detection is initiated on a second frame by a second detection model. A second set of objects are identified as being associated with a third frame that is subsequent to the first frame in the video stream. The first object is included in the second set based on tracking the first object from the first frame to the third frame. A second object is identified within the second frame based on the second detection model. When the first object corresponds to the second object but has a different attribute, an attribute of the first object is updated. When the first object does not correspond to the second object, the second object is fast-tracked into the third frame.

15 Claims, 5 Drawing Sheets

(51) Int. Cl.
*G06N 3/00* (2023.01)
*G06V 10/80* (2022.01)
*G06V 20/50* (2022.01)
*G06V 30/24* (2022.01)
*G06V 30/30* (2022.01)
*G06V 40/00* (2022.01)

(52) U.S. Cl.
CPC .................. *G06F 9/50* (2013.01); *G06N 3/00* (2013.01); *G06V 30/24* (2022.01); *G06V 30/30* (2022.01); *G06V 40/00* (2022.01)

(56) References Cited

OTHER PUBLICATIONS

Jang, Si Young, Boyan Kostadinov, and Dongman Lee. "Microservice-based edge device architecture for video analytics." 2021 IEEE/ACM Symposium on Edge Computing (SEC). IEEE Computer Society, 2021.*

Guo, Siyan, et al. "$Ec^2$detect: Real-time online video object detection in edge-cloud collaborative iot." IEEE Internet of Things Journal 9.20 (2022): 20382-20392.*

Chen, et al., "Frugal following : power thrifty object detection and tracking for mobile augmented reality, Proceedings of the 17th Conference on Embedded Networked Sensor Systems", Nov. 10-13, 2019, pp. 96-109.

Gao, et al., "SmartEye: An Open Source Framework for Real-Time Video Analytics with Edge-Cloud Collaboration", Proceedings of the 29th ACM International Conference on Multimedia, Oct. 20-24, 2021, pp. 3767-3770.

International Search Report and Written Opinion received for PCT Application No. PCT/US23/017645, (MS# 411280-PCT01), Aug. 28, 2023, 10 pages.

* cited by examiner

ASYNCHRONOUSLY UPDATING OBJECT DETECTIONS WITHIN A VIDEO STREAM

CROSS-REFERENCE TO RELATED APPLICATIONS

The present application is a U.S. National Stage of International Application No. PCT/US2023/017645, filed on Apr. 5, 2023, designating the United States and claiming the priority of India patent application No. 202241025789 filed with the Indian Patent Office on May 3, 2022. All of the aforementioned applications are incorporated herein in their respective entirety by this reference.

TECHNICAL FIELD

The present disclosure relates to systems, methods, and devices that perform object detection on video streams.

BACKGROUND

Computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. As one example, emerging Internet of Things (IoT) and mobile computing applications involve analysis of video streams, and identification of objects within those video streams using deep neural network (DNN) detection models that are compute intensive (e.g., dependent on powerful graphics processing units (GPUs)) and tend to have large memory requirements. Thus, classically, such devices would operate within a cloud computing network architecture, by sending video streams over one or more computer networks to more powerful cloud computing devices operating these DNN detection models, and then receive and act on the results of that analysis.

More recently, many IoT devices—such as Augmented Reality (AR) and Mixed Reality (MR) headsets—have been expected to react to video inputs at low latencies that, due to network delays, are difficult or impossible to achieve using a cloud computing architecture. Thus, due at least in part to latency-sensitive workloads such as those handled by AR and MR headsets, computer networks are evolving towards an edge-computing architecture, where compute tasks are located closer to the end-device to help achieve low latency. For example, in an edge-computing architecture the edge device, itself, operates the DNN detection model. However, edge computing devices generally have far lower power budgets and fewer computing resources than cloud computing devices, and thus operate smaller and less accurate detection models than those operating on cloud computing devices. Thus, video processing on edge computing devices comes with a tradeoff: lower latency but constrained resources, and hence reduced accuracy, compared to the cloud.

BRIEF SUMMARY

In some aspects, the techniques described herein relate to a computer-implemented method for asynchronously updating object detections within a video stream, the computer-implemented method including: identifying a first set of objects within a first frame of a video stream, the first set of objects including a first object that was detected by a first detection model, the first set of objects including a first definition of the first object using a first attribute and a location of the first object within the first frame; initiating object detection on a second frame of the video stream by a second detection model; after initiating object detection on the second frame by the second detection model, identifying a second set of objects within a third frame of the video stream that is different than the first frame and the second frame, the second set of objects including the first object based on tracking the first object across a set of frames occurring in the video stream between the first frame and the third frame, the second set of objects including a second definition of the first object using the first attribute and a location of the first object within the third frame; based at least on initiating object detection on the second frame by the second detection model, identifying a second object within the second frame, the second object being associated with a second attribute and a location of the second object within the second frame; and determining if the second object corresponds to an object in the first set of objects, and performing one of: based at least on determining that the second object corresponds to the first object in the first set of objects, and on the first attribute being different than the second attribute, updating the second definition of the first object to use the second attribute; or based at least on determining that the second object differs from any object in the first set of objects: tracking the second object into the third frame, and updating the second set of objects to include a definition of the second object that defines the second object using the second attribute and a location of the second object within the third frame.

In some aspects, the techniques described herein relate to a computer system for asynchronously updating object detections within a video stream, including: a processor; and a computer storage medium that stores computer-executable instructions that are executable by the processor to cause the computer system to at least: identify a first set of objects within a first frame of a video stream, the first set of objects including a first object that was detected by a first detection model, the first set of objects including a first definition of the first object using a first attribute and a location of the first object within the first frame; initiate object detection on a second frame of the video stream by a second detection model; after initiating object detection on the second frame by the second detection model, identify a second set of objects within a third frame of the video stream that is different than the first frame and the second frame, the second set of objects including the first object based on tracking the first object across a set of frames occurring in the video stream between the first frame and the third frame, the second set of objects including a second definition of the first object using the first attribute and a location of the first object within the third frame; based at least on initiating object detection on the second frame by the second detection model, identify a second object within the second frame, the second object being associated with a second attribute and a location of the second object within the second frame; and determine if the second object corresponds to an object in the first set of objects, and perform one of: based at least on determining that the second object corresponds to the first object in the first set of objects, and on the first attribute being different than the second attribute, update the second definition of the first object to use the second attribute; or based at least on determining that the second object differs from any object in the first set of objects: track the second object into the third frame, and update the second set of objects to include a definition of the second object that defines the second object using the second attribute and a location of the second object within the third frame.

In some aspects, the techniques described herein relate to a computer-readable medium that stores computer-executable instructions that are executable by a processor to cause a computer system to asynchronously update object detections within a video stream, including computer-executable instructions that are executable to cause the computer system to at least: identify a first set of objects within a first frame of a video stream, the first set of objects including a first object that was detected by a first detection model, the first set of objects including a first definition of the first object using a first attribute and a location of the first object within the first frame; initiate object detection on a second frame of the video stream by a second detection model; after initiating object detection on the second frame by the second detection model, identify a second set of objects within a third frame of the video stream that is different than the first frame and the second frame, the second set of objects including the first object based on tracking the first object across a set of frames occurring in the video stream between the first frame and the third frame, the second set of objects including a second definition of the first object using the first attribute and a location of the first object within the third frame; based at least on initiating object detection on the second frame by the second detection model, identify a second object within the second frame, the second object being associated with a second attribute and a location of the second object within the second frame; and determine if the second object corresponds to an object in the first set of objects, and perform one of: based at least on determining that the second object corresponds to the first object in the first set of objects, and on the first attribute being different than the second attribute, update the second definition of the first object to use the second attribute; or based at least on determining that the second object differs from any object in the first set of objects: track the second object into the third frame, and update the second set of objects to include a definition of the second object that defines the second object using the second attribute and a location of the second object within the third frame.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Figure 1:
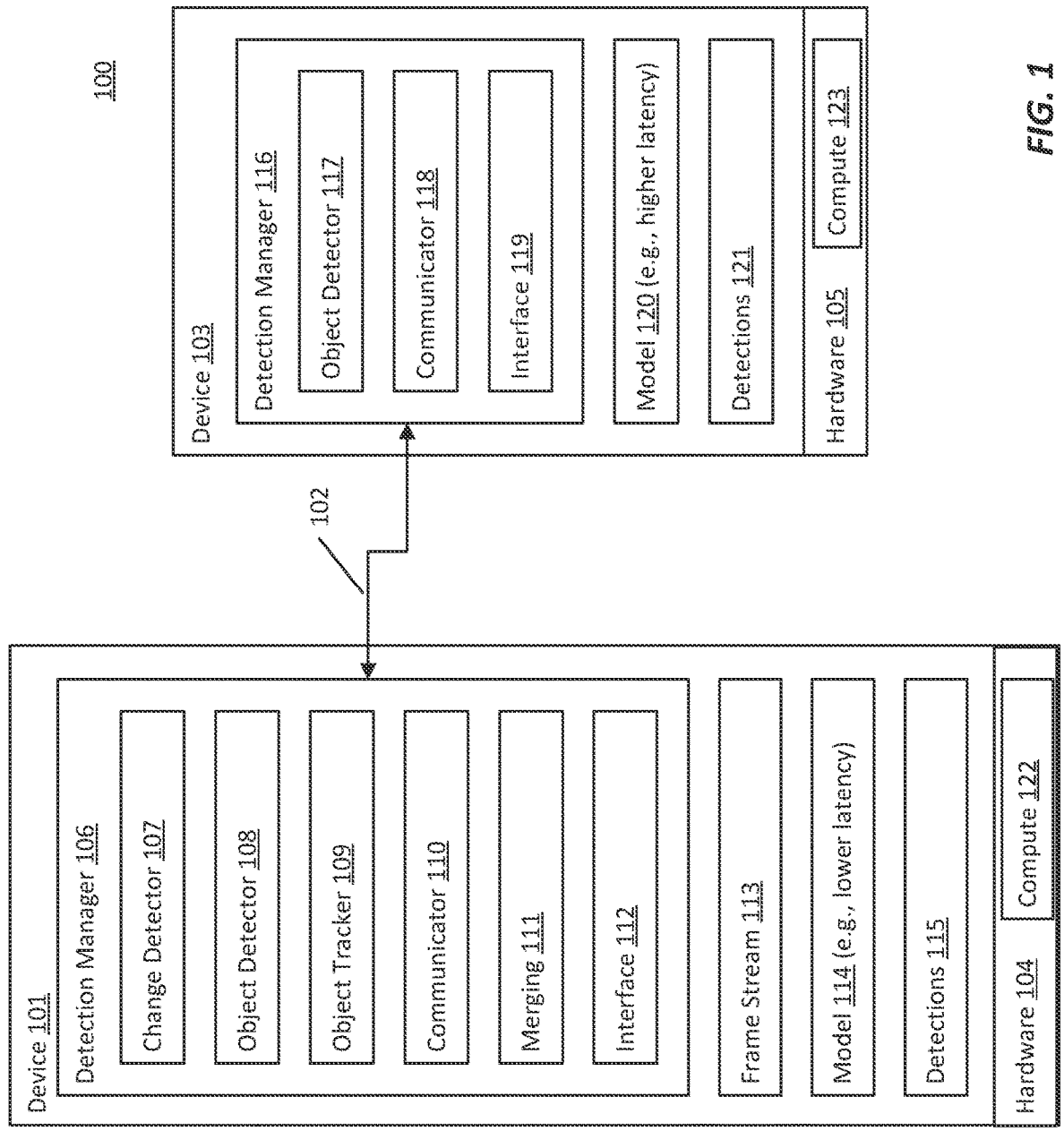
FIG. 1 illustrates an example computer architecture that facilitates asynchronously updating object detections within a video stream.

At least some embodiments described herein identify object detections within a video stream using a first detection model, while asynchronously updating those object detections using a second detection model. In embodiments, the detections from the second detection model correct past output of the first detection model, and cascade these results for current predictions by the first detection model, thereby improving the overall accuracy of object detections.

In one example, the embodiments described herein perform a continual object detection analysis on the video stream using a lower-latency detection model (e.g., a local detection model and/or a lower accuracy model that consumes relatively fewer computing resources), while occasionally performing an object detection analysis using a higher-latency detection model (e.g., a remote detection model and/or a higher accuracy model that consumes relatively greater computing resources) and merging the results of the higher-latency detection with the results of the lower-latency detection. Thus, in this example, the embodiments herein use an occasional redundant higher-latency detection to improve the accuracy of a continual lower-latency detection.

In one embodiment, the first detection model operates at an edge computing device, while the second detection model operates at a cloud computing device. In this embodiment, the inventors have observed that merging cloud object detections with edge object detections allows applications executing at an edge device to achieve low latency comparable to edge-only object detection, while significantly improving overall object detection accuracy relative to edge-only object detection. For example, the inventors have observed that merged edge-cloud object detection can outperform the accuracy of edge-only and cloud-only scenarios by as much as fifty percent.

In embodiments, the second detection model may be occasionally unavailable, such as due to reduced local computing resource availability (e.g., caused by a low power condition, by reduced processing resource availability), or due to an interruption of connectivity to remote computing resources. Continual use of the first detection model enables uninterrupted lower-latency object detections as the video stream progresses, even when the second detection model is unavailable, while still being able to take advantage of improved overall object detection accuracy when the second detection model is available. The inventors have observed that, even with varying response latency from the cloud, the embodiments herein perform better than the edge-only object detection.

In embodiments, where the second detection model is only used for occasional detections, use of computing resources (such as cloud computing resources) for operating the second decoction model are light, when compared to a cloud-only scenario. It has been observed that, when using the techniques described herein, a single cloud machine with a server class GPU can support over sixty edge devices.

Overall, the inventors have observed that the techniques described herein enable a whole new classes of low-latency edge computing scenarios with modest resource use at the edge computing devices, such as rich and performant AR/MR headsets, dashcam-based driver assist, and drone-based search and rescue.

FIG. 1 illustrates an example computing environment 100 that facilitates asynchronously updating object detections within a video stream. As shown, computing environment 100 includes a device 101 comprising hardware 104. Hardware 104 comprises, for example, one or more processors, system memory, a storage medium, and the like, and is expressly shown as including compute hardware 122 (e.g., processor, GPU) for executing a model 114 (e.g., a first DNN detection model). In FIG. 1, computing environment 100 also includes a device 103 comprising hardware 105 which, like hardware 104, comprises processor(s), system memory, storage media, etc., and which is expressly shown as including compute hardware 123 (e.g., processor, GPU) for executing a model 120 (e.g., a second DNN detection model). In embodiments, model 114 represents a single DNN detection model or a plurality of DNN detection models, and/or model 120 represents a single DNN detection model or a plurality of DNN detection models.

As shown, device 101 operates a detection manager 106, while device 103 operates a detection manager 116. In embodiments, detection manager 106 identifies sets of detections 115 of objects within a frame stream 113 (i.e., a video stream) using model 114. Additionally, detection manager 106 at least periodically requests redundant object detections by detection manager 116, and uses those redundant object detections to update detections 115 based on detections 121 of objects made by detection manager 116 using model 120. In an embodiment, model 114 is smaller than and/or utilizes lower complexity mathematical operations than model 120 (e.g., model 114 uses integer operations, while model 120 uses float operations), and thus model 120 may produce higher accuracy results than model 114. However, embodiments are also operable and useful even when model 114 and model 120 have the same computational cost.

In a first embodiment, device 101 is an edge computing device, and device 103 is a remote (e.g., cloud) computing device, with an interconnection 102 between these devices being at least one network. In this first embodiment, detection manager 106 is an edge detection manager and the detection manager 116 is a cloud detection manager and, due at least to delays caused by interconnection 102, results from model 114 are available to the detection manager 106 at a lower latency than results from model 120 (e.g., if submitting the same frame to model 114 and model 120 at the same time, it would take more time, in terms of a number of video frames that elapse in frame stream 113, for model 120 to produce results than it takes for model 114 to produce results).

In a second embodiment, device 101 and device 103 are the same device, with at least a portion of hardware 104 overlapping with hardware 105, and with the interconnection 102 between these devices being at least one bus. In this second embodiment, detection manager 106 is a primary detection manager and the detection manager 116 is a secondary detection manager, and detection manager 106 receives results from model 114 at a lower latency than detection manager 116 receives results from model 120 (e.g., due to an amount of power budget and/or compute resources allocated to model 114 versus model 120, due to a size and/or complexity of model 114 versus model 120).

Figure 2:
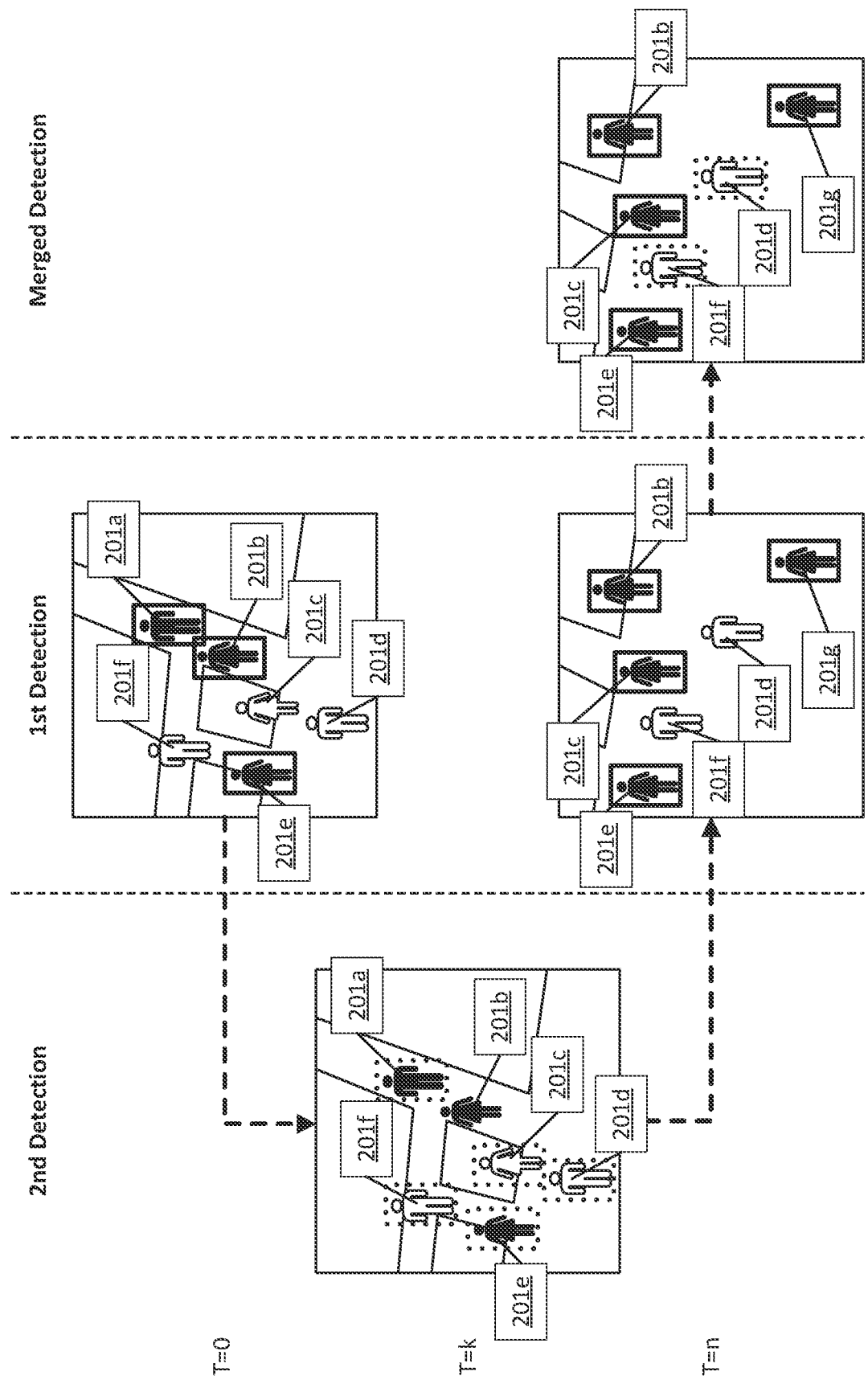
FIG. 2 illustrates an example that demonstrates an improvement of overall accuracy of object detection, through use of redundant object detections to asynchronously update object detections within a video stream.

FIG. 2 illustrates an example 200 that demonstrates an improvement of overall accuracy of object detection, through use of redundant object detections to asynchronously update object detections within a video stream. Example 200 shows detection of objects of interest (e.g., people) within an area (e.g., a flood-affected riverbank collected from an aerial drone) at two different points in time, t=0 and t=n. As shown, at time t=0, a first detection by detection manager 106 (using model 114) identifies a set of detections comprising each of object 201a, object 201b, and object 201e from a first video frame, along with solid line bounding boxes indicating the detected location of each of these objects within the first frame. Notably, there are several objects (i.e., object 201c, object 201d, and object 201f) not detected by model 114 (e.g., due to a low-latency requirement imposed on the first model, or due to a lack of clarity of those objects in the first frame, as indicted by those objects appearing in white rather than in black).

As indicated by an arrow, detection manager 106 submits this this first frame to detection manager 116 for a redundant object detection, and detection manager 116 identifies a set of detections comprising each of object 201a, object 201c, object 201d, object 201e, and object 201f using model 120, along with broken line bounding boxes indicating the detected location of each of these objects within the first frame. In example 200, model 120 achieves higher accuracy than model 114 (i.e., it identified object 201c, object 201d, and object 201f while model 114 did not), but comes with additional latency (i.e., the results of the first frame sent to detection manager 116 at time t=0 are detected at time t=k). Notably, model 120 did not detect object 201b, even though model 114 did (e.g., due to differences in training data used to train those models).

Later, at time t=n, the scene has changed in a second video frame (e.g., due to movement of the aerial drone, and/or due to movement of the people in the area), with some objects (i.e., object 201b, object 201c, object 201d, object 201e, and object 201f) still being common across the first and second frames, and a new object (i.e., object 201g) being newly present in the second frame. While the detection manager 106 has detected each of object 201b, object 201c, object 201e, and object 201g within this second frame (e.g., using model 114 or object tracking), it has still not detected each of object 201d and object 201f. However, in embodiments, the detection manager 106 takes objects detected by detection manager 116 at time k<n, and merges those detections with the frame at time t=n, as shown in the "Merged Detection" column (e.g., using model 114 or object tracking, implementations of which are described later with respect to FIG. 4). Thus, using redundant but higher latency and higher accuracy detections by the detection manager 116 on the first frame, detection manager 106 asynchronously updates less accurate but lower latency detections by the detection manager 106, thereby increasing the overall accuracy of detections within the second frame.

FIG. 1 illustrates example internal components of detection manager 106 and detection manager 116. Each of these internal components represents various functionalities that these detection managers might implement in accordance with various embodiments described herein. It will be appreciated, however, that the depicted components—including their identity and arrangement—are presented merely as an aid in describing example embodiments of detection manager 106 and detection manager 116.

As shown, detection manager 106 comprises a change detector 107. In embodiments, the change detector 107 facilitates conservation of computing and power resources at device 101 and/or device 103, while balancing object detection accuracy. Notably, running object detection on every frame in a video can drain system resources quickly. In embodiments, the detection manager 106 utilizes two parameters—a detection frequency ("k") by the detection manager 106 and a detection frequency ("m") by the detection manager 116. Intuitively, if there is little object displacement across frames, running detection models frequently will lead to wastage of resources. In embodiments, the detection manager 106 employs the change detector 107 to compute an optical flow on successive frames, representing the relative motion of the scene comprising objects and the camera. Thus, object detection invocations can occur at a detection frequency of every $k^{th}$ frame by the detection manager 106 and every $m^{th}$ frame by the detection manager 116, with k and m being determined based on relative motion of the scene (e.g., with those parameters being integers that increase as relative motion between frames increases, and that decrease as relative motion between frames decreases).

Detection manager 106 also comprises an object detector 108. In embodiments, for every $k^{th}$ frame of frame stream 113, the object detector 108 submits that frame to model 114 for object detection, resulting in a set of detections 115 by model 114 for that frame. In embodiments, this set of detections 115 is represented as a list of <l, p> tuples, one tuple per detected object, with "l" being a set of attributes of the detected object, and "p" defining a location for the detected object within the frame. In embodiments, this set of detections 115 is represented as a list of <l, c, p> tuples, one tuple per detected object, with "l" being a set of attributes of the detected object, "p" defining a location for the detected object within the frame, and "c" being a confidence score associated with this detection (e.g., ranging from 0.0 and 1.0, a predetermined minimum and 1.0, etc.). In embodiments, the confidence score reflects the confidence of the attribute. In embodiments, multiple tuples may refer to the same detected object. In embodiments, the set of detections is represented as a list of <<l, c>=,p> tuples, with <l, c>+ representing a set of tuples, each tuple comprising an attribute, l, and its corresponding confidence score, c.). In embodiments, the attribute is a class label (e.g., car, person), a detected pose (e.g., a type of stoke a tennis player is performing), and the like. In embodiments, the attribute is a tuple, such as <Man, Sitting, Reading newspaper>, <Car, Blue color, Sedan>, and the like. In embodiments, p defines a bounding box of the detected object (e.g., as (x, y, w, h), where "x, y" is the center coordinate of the object, and "w, h" is the width and height of the bounding box; Alternatively, (x1, y1, x2, y2), where x1,y1 is one corner, and x2, y2 is the opposite corner; Of course, other data that defines a bounding box could similarly be used), a silhouette of the object (e.g., instance segmentation), a mask of the frame's pixels that overlap with the object, and the like. In general, embodiments can define any subset of a frame's pixels that correspond to a detected object.

In embodiments, to avoid detections for the same object, the object detector 108 utilizes techniques such as non-max suppression to avoid repeated detection of the same object instance, and trim the output list. Additionally, or alternatively, in embodiments the object detector 108 trims the output list to remove objects with a low confidence score (e.g., c<=0.5).

As mentioned, in embodiments, the object detector 108 performs object detections every k frames. In order to track objects between frames on which the object detector 108 performs object detections, the detection manager 106 also comprises an object tracker 109, which tracks objects between frames for which object detections are available. In embodiments, object tracking is a computationally cheaper technique than object detection. In some implementations, as the quantum of associated displacement of objects increases, the accuracy decreases. In embodiments, the object tracker 109 accounts for degradation of accuracy over time by multiplying every tracked object's confidence scores by a decay rate, $\delta \in [0, 1]$. In embodiments, the decay rate is dynamic, such as being provided by the object tracker 109 to correspond to the confidence level of the tracking. Then, as the confidence scores may be reduced with every passing frame with this multiplier, the object tracker 109 sweeps over the detections 115 to discard the ones with lower confidence scores (e.g., c<0.5).

Detection manager 106 also comprises a communicator 110. In embodiments, the communicator 110 sends every $m^{th}$ frame (i.e., the detection frequency for the detection manager 116) to the detection manager 116 for object detection by the detection manager 116 using model 120, and receives associated output annotations from the detection manager 116. As shown, the detection manager 116 comprises a communicator 118, which receives frames from communicator 110, and which sends associated output annotations to the detection manager 106.

In embodiments, the detection manager 116 operates to respond to object detection requests from the detection manager 106, by inputting received frame(s) to model 120, and sending annotations of the detected object(s) back to the detection manager 106. Thus, detection manager 116 is illustrated comprising an object detector 117, which operates similarly to object detector 108, but using model 120. In embodiments, similar to object detector 108, object detector 117 produces detections 121 (e.g., a list of <l, p>, <l, c, p> or <l, c>+p> tuples, or similar data structures associating attribute(s) with detected object(s), and returns at least some of those detections to detection manager 106 as the output annotations. In embodiments, object detector 117 returns a subset of its detections based on excluding objects already known to detection manager 106. In embodiments, the type of the detections 121 produced by model 120 differs from the type of the detections produced by object detector 108. For example, model 114 may identify a different set of attributes than model 120 (e.g., model 114 may output cat and model 120 may output dog). In embodiments, since the detection manager 116 executes larger and more accurate object detection models, it provides better accuracy over lightweight models used by the detection manager 106.

In embodiments, device 103 is a cloud device, such that the detection manager 116 is shared across numerous edge devices (e.g., device 101) to handle multiple inference requests at any given time. In embodiments, detection manager 116 maintains a request queue with multiple worker threads (e.g., of detection manager 116, of object detector 117) to increase throughput while adhering to a latency constraint.

In embodiments, the communicator 110 transmits frames asynchronously to the detection manager 116 (i.e., asynchronous from main object detection by the object detector 108 and main object tracking by the object tracker 109). In embodiments, since the detection frequency m of the detection manager 116 is based on objects' motion as determined by the change detector 107, if the change is below a threshold the communicator 110 refrains from transmitting frames to the detection manager 116 for object detection. For example, since the detection manager 116's annotations 302 relate to older frames (e.g., due to latency), its predictions might become stale (i.e., fall outside the current frame boundaries) by the time they return to the detection manager 106. In embodiments, the detection frequency I may be dynamically adjusted based on the rate of change detected by the change detector 107 in frame stream 113. For example, when changes in frame stream 113 are below a threshold, the values for m and/or k may be increased, reducing computational costs. Similarly, when changes in frame stream 113 are above a threshold, in embodiments a detection is started (at either, or both, of detection managers 106, 116), regardless of when the prior detection was initiated.

Detection manager 106 also comprises a merging component 111. In embodiments, the merging component 111 applies a novel fusion/merging algorithm to combine higher-accuracy detections by the detection manager 116 on recent frames with inference by the detection manager 106 on a current frame, while removing stale results not relevant to the current frame. Since output of model 114 at device 101 and model 120 and device 103 may be different, both may detect the same object and the bounding boxes, but the confidence scores, and sometimes the attributes may differ due to the model differences. The merging component 111 operates to combine predictions at the detection manager 106 and at the detection manager 116, and to avoid repeated instances of the same object, while adding previously undetected ones.

Figure 3:
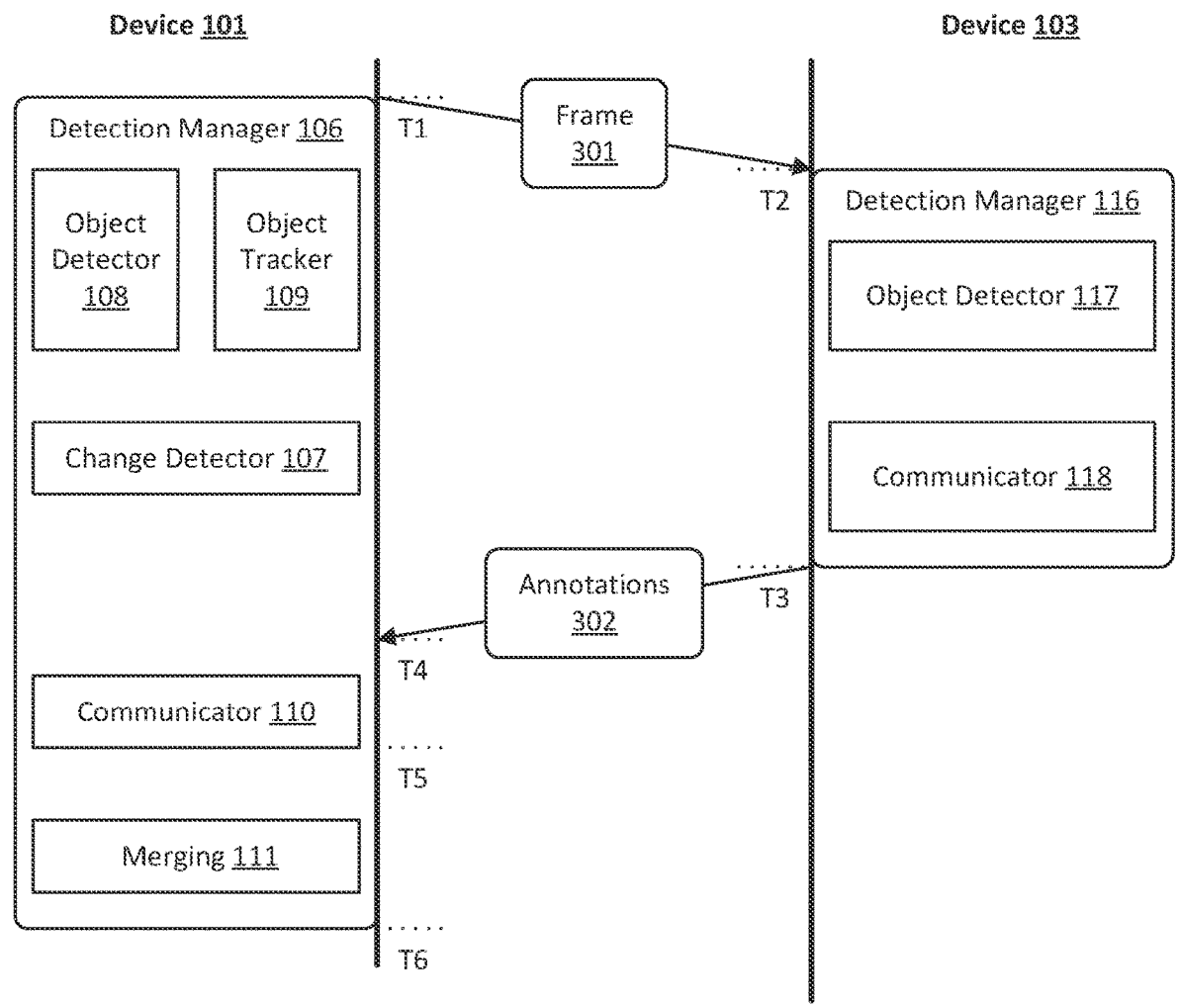
FIG. 3 illustrates a timeline showing asynchronous use of redundant object detections to improve object detection accuracy.

FIG. 3 illustrates a timeline 300 showing asynchronous use of redundant object detections to improve object detection accuracy. As shown, at time T1, the detection manager 106 at device 101 sends a frame 301 to the detection manager 116 at device 103, and the detection manager 116 receives that frame 301 at time T2. In some embodiments, time T1 is prior to an object detection by object detector 108 on frame 301, while in other embodiments time T1 is after an object detection by object detector 108 on frame 301. In some embodiments, the object detector 108 never actually operates on frame 301 (e.g., object detector may have operated on a frame from T0 or earlier), but instead objects in frame 301 are identified by the detection manager 106 using the object tracker 109.

After receiving frame 301, the detection manager 116 runs an object detection on frame 301 using object detector 117, and sends annotations 302 (identifying a set of detected objects) back to the detection manager 116 at time T3, with those annotations 302 being received at device 101 at time T4 and being available to the detection manager 106 at time T5.

At device 101, prior to and up to time T5, the detection manager 106 performs object tracking (object tracker 109), and possibly object detection (object detector 108), on one or more frames that are that are subsequent to frame 301 in a video stream. Additionally, the detection manager 106 potentially detects changes in motion (change detector 107) to adjust k and m detection frequency parameters. Thus, when receiving the annotations 302 for frame 301 at time T5, the detection manager 106 has moved past the frame (i.e., frame 301) sent at time T1. The detection manager 106 therefore uses the merging component 111 to merge detections within the annotations 302 into a current frame at time T6. As will be appreciated in view of timeline 300, the detections 115 from the object detector 108 are available for immediate use by the detection manager 106; however, the annotations 302 received from the detection manager 116 are delayed and thus do not correspond to the current frame.

In some embodiments, an object detected by detection manager 116 for a prior frame overlaps with an object already known by the detection manager 106 for that prior frame (e.g., object 201a in example 200). In embodiments, when this occurs the merging component 111 may merge these objects, such as by updating an attribute of the object already known by the detection manager 106 with an attribute identified by the detection manager 116. For example, since model 120 may yield higher accuracy results than model 114, model 114 may misclassify an object. Thus, the merging component 111 can correct an object's attribute with a value identified by the detection manager 116. In these embodiments, the merging component 111 may determine if that object still exists in the current frame, and update an attribute for that object as it relates to that frame. In embodiments, when the attribute is a tuple (e.g., <Man, Sitting, Reading newspaper>), the merging component 111 merges each element of the attribute tuple separately for merging results.

In order to facilitate the foregoing overlap detection, in embodiments the detection manager 106 stores set(s) of detections for one or more prior frames (e.g., for m prior frames) as part of detections 115. In some embodiments, overlap detection is performed on the frame that was sent to the detection manager 116, using one of these stored sets of detections. In other embodiments, overlap detection is performed on a frame that occurs after the frame that was sent to the detection manager 116, using a stored set of detections. In these other embodiments, object detection is performed on an object that was tracked into that frame by the object tracker 109, and this object may have changed location between frames. Thus, in embodiments, the detection of overlap considers these changes in location.

In some embodiments, an object detected by detection manager 116 for a prior frame does not overlap with an object already known by the detection manager 106 for that prior frame (e.g., object 201f in example 200). In order to use this detection to improve the current frame's detection, in embodiments the merging component 111 "fast-tracks" this prediction from the prior frame into the current frame. In embodiments, the merging component 111 starts a new instance of the object tracker 109, initializing it with predictions from the detection manager 116. This new instance of the object tracker 109 then tracks these objects across frames until reaching the current frame. In embodiments, this new instance of the object tracker 109 tracks objects across every other frame (stride=2). However, in embodiments this stride could be increased at the cost of decreased localization accuracy. In embodiments, the stride may be dynamic, based on the rate of change previously detected between video frames, such as by change detector 107.

Figure 4:
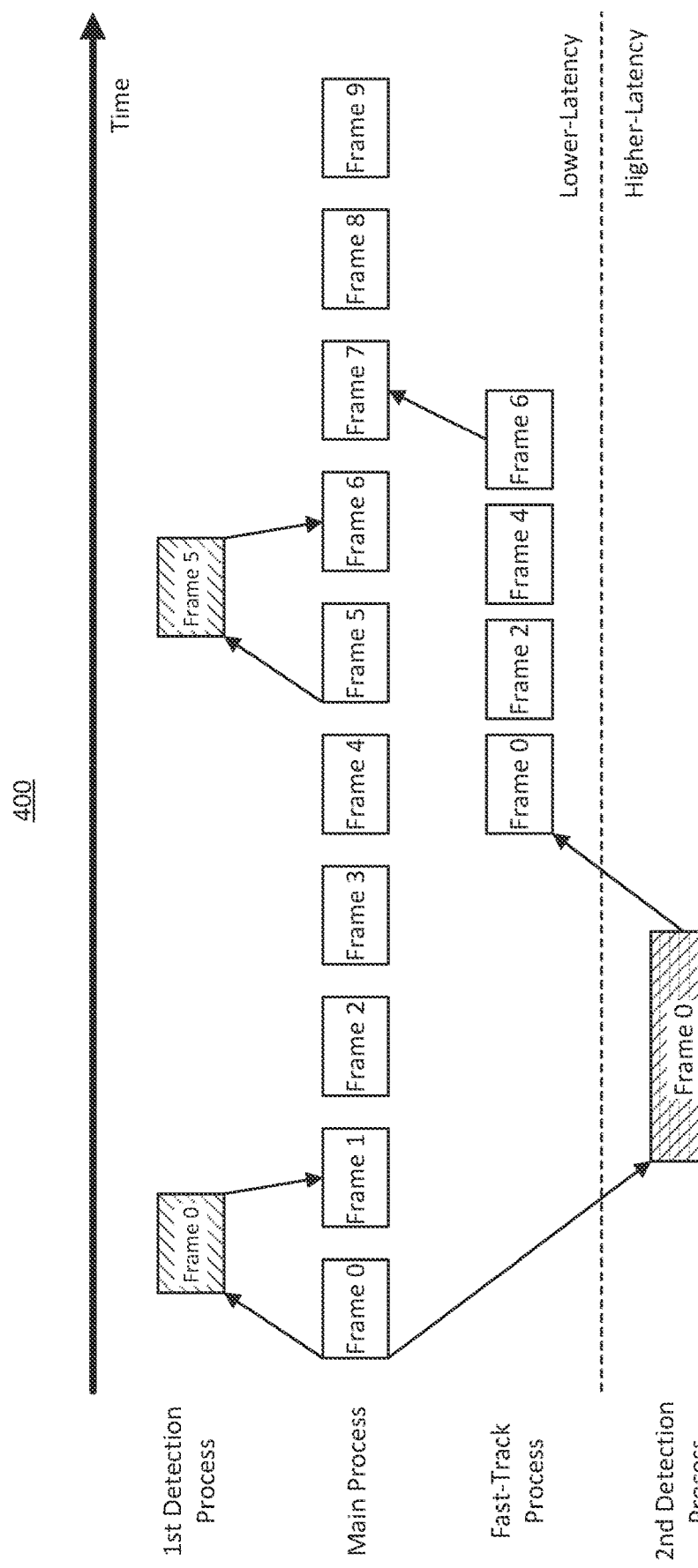
FIG. 4 illustrated a timeline showing an example of a fast-track process.

FIG. 4 illustrates a timeline 400 showing an example of a fast-track process, as performed by the merging component 111. As shown, in timeline 400, time progresses from left to right. In embodiments, elements appearing above the horizontal dashed line represent actions by detection manager 106 (lower-latency), while elements appearing below the horizontal dashed line represent actions by detection manager 116 (higher-latency).

As shown in timeline 400, the detection manager 106 carries out a continual Main Process for object detection within a video stream, with that main process tracking objects (e.g., using the object tracker 109) across frame 0 (which could be the first frame in the video stream, or some subsequent frame in the video stream), frame 1, frame 2, and so on to frame 9 and beyond. As shown in timeline 400, the detection manager 106 also performs an object detection (1st Detection Process) using the object detector 108 (and model 114) on every fifth frame (i.e., frame 0, frame 5, etc., such that detection frequency k is five). As shown in timeline 400, the detection manager 106 also sends frame 0 (e.g., the frame shown at time t=0 in example 200) to the detection manager 116 for an additional object detection (2nd Detection Process) by the object detector 117 (and model 120).

Due to network delays, model latencies, restricted computing or power resources, etc., results of this second detection on frame 0 (e.g., as showing in the frame at time t=k in example 200) are delayed until frame 4 of the main process. If an object in these results is simply mislabeled, this label can be corrected at frame 4. If an object is newly identified in these results, the merging component 111 performs a fast-track process to bring this object detected by the object detector 117 to a current frame (e.g., frame 7, in timeline 400). In timeline 400, the merging component 111 uses a new instance of the object tracker 109 to track these objects from frame 0 to frame 6, skipping every other frame (stride=2), and merges those results into frame 7 (e.g., the frame shown at time t=n in example 200).

In embodiments, the merging component 111 determines if an object known by the detection manager 106 overlaps with a prediction by the detection manager 116 using a box fusion technique. In embodiments, the box fusion technique operates by the detection manager 106 maintaining a current list of objects for the present frame (e.g., detections 115). Whenever there are any new detections, either from change detector 107 or object detector 117, the merging component 111 first deletes the old objects from the current list that were last submitted by the same detection source. For example, the merging component 111 deletes old objects previously detected by the detection manager 116 (object detector 117) when newer detections are available from the detection manager 116, and deletes old objects previously detected by the detection manager 106 (object detector 108) when newer detections are available from the detection manager 106.

Next, the merging component 111 creates an Intersection over Union (IoU) matrix that indicates the overlap between current objects and the detections received. In embodiments, an IoU is the ratio of overlapped area with the union of the area between the two sets of objects. In embodiments, any value smaller than a threshold (≥0.5) is set to zero, and the merging component 111 performs a linear sum assignment, which matches two objects with the maximum overlap. This IoU matrix provides a list of objects that were already present in the current object list. The merging component 111 then modifies the confidence values, location (e.g., bounding box or silhouette), and annotation(s) (e.g., class label) based on the new detections' source. For example, objects from the detection manager 116 obtained from running bigger models will be more accurate in predicting a class label correctly.

Notably, the merging component 111 is shown in FIG. 1 as being part of the detection manager 106. However, in alternate embodiments, the merging component 111 at least partially exists at the detection manager 116. Thus, at least a portion of the merge process described in connection with the merging component 111, in some embodiments, is performed by detection manager 116. Additionally, in some embodiments, in addition to sending a video frame to the detection manager 116, the communicator 110 also sends a list of objects that are associated with that frame. In embodiments, the video frame is sent with the list of objects for that frame. In embodiments, the detection manager 116 uses this list as part of a merge process performed by the detection manager 116. Additionally, or alternatively, in embodiments, the detection manager 116 uses this list to return only annotations for objects not already known by the detection manager 106 and/or for objects that have been classified differently by model 120.

Detection manager 106 also comprises an interface 112 and the detection manager 116 also comprises an interface 119. In embodiments, interface 112 is an application programming interface (API) that exposes an edge interface and interface 119 is an API that exposes a cloud interface. In embodiments, an instance of interface 119 can be instantiated based one or more of: an address of an endpoint (e.g., a network address of device 103), an image resolution (e.g., of frames in frame stream 113), a model (e.g., model 120), a frequency parameter (e.g., m), an object tracker type, or a number of object tracker threads. In embodiments, an instance of interface 112 can be instantiated based on one or more of: a model to run (e.g., model 114), an image resolution (e.g., of frames in frame stream 113), a frequency parameter (e.g., k), an object tracker type, a number of object tracker threads, or which cloud interface (e.g., instance of interface 119) to use. In embodiments, interface 112 and interface 119 both expose a corresponding method to get annotations which uses an image as input, and which returns an annotation output.

Embodiments are now described in connection with FIG. 5, which illustrates a flow chart of an example computer-implemented method 500 for asynchronously updating object detections within a video stream. In embodiments, instructions for implementing method 500 are encoded as computer-executable instructions (e.g., implementing detection manager 106 and/or detection manager 116) stored on a computer storage media that are executable by a processor to cause a computer system (e.g., device 101 and/or device 103) to perform method 500.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 5:
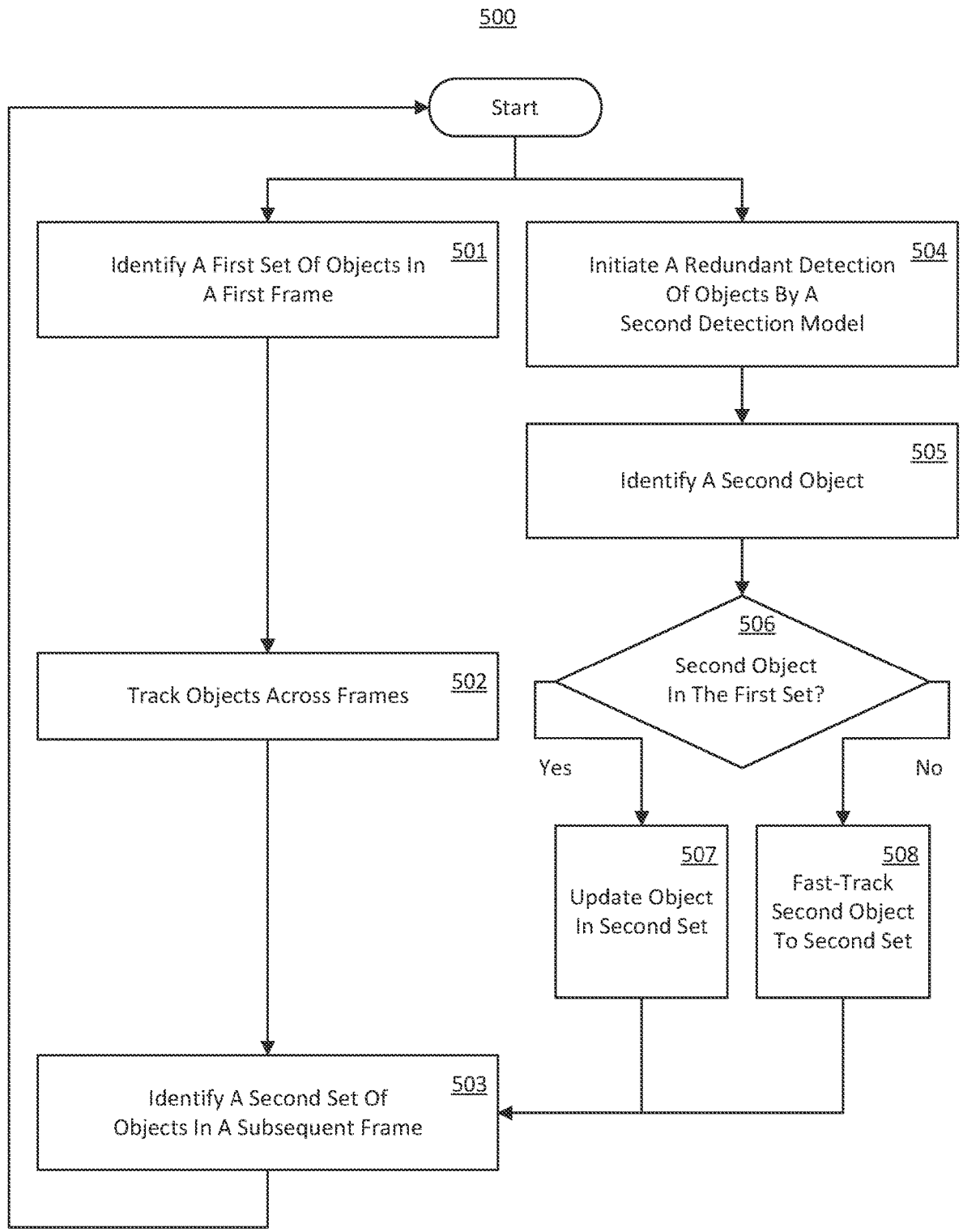
FIG. 5 illustrates a flow chart of an example method for asynchronously updating object detections within a video stream.

Referring to FIG. 5, in embodiments, method 500 includes two paths—one path from act 501 to act 503 (e.g., a main object detection process), and another path from act 504 to act 507 or act 508 (e.g., a redundant object detection and merging process that feeds results into the main object detection process).

Referring first to the main object detection process, method 500 comprises an act 501 of identifying a first set of objects in a first frame. A set of objects is one or more objects so that the term "set" does not include the empty set. In an example identifying a first set of objects in a first frame comprises detecting two people and a vehicle so that the first set comprises three objects. In some embodiments, act 501 comprises identifying a first set of objects within a first frame of a video stream, the first set of objects including a first object that was detected by a first detection model, the first set of objects including a first definition of the first object using a first attribute and a location of the first object within the first frame. In an example, the detection manager 106 identifies a set of detections 115 associated with a first frame within frame stream 113 (e.g., the frame at t=0 in example 200, or frame 0 in timeline 400), with at least one of those detections originating from model 114 (either based on performing an object detection this first frame using model 114, or based on tracking an object detected by model 114 into this first frame). In an example, the first object is associated with a tuple that defines an attribute of the detected object (e.g., a class label of "person"), and a location of the detected object within the first frame (e.g., in reference to a center coordinate and bounding box). In embodiments, technical effects of act 501 include the detection of objects within a video frame, which objects can be tracked to subsequent video frames.

In embodiments, the first attribute defines at least one of a pose or a class label. In embodiments, the location of the first object within the first frame defines at least one of a bounding box surrounding the first object or a silhouette of first object. In embodiments, defining a pose attribute has an effect of identifying a position of a detected object, such as identifying a stroke being performed by a tennis player, identifying a dance move being performed by a dancer, and the like. In embodiments, defining a class label attribute has an effect of classifying an object by its identity (e.g., car, van, truck, person, animal, UFO, cloud, building, etc.). In embodiments, defining a location as a bounding box provides a general location of an object within a frame, while defining a location as a silhouette provides a location of an outline of the object within a frame.

In some embodiments, the first object is first detected by model 114 as part of act 501. In these embodiments, the first set of objects in act 501 includes the first object based on initiating object detection on the first frame by the first detection model. For example, referring to the frame shown at time t=0 in example 200, the object detector 108 identifies object 201*a*, object 201*b*, and object 201*e* using model 114.

In other embodiments, the first object is first detected by model 114 as part of a prior frame (e.g., during a prior invocation of method 500), and it was tracked into the first frame by the object tracker 109. In these embodiments, the first set of objects of act 501 includes the first object based on tracking the first object from a frame (e.g., a fourth frame) preceding the first frame in the video stream. For example, referring to the frame shown in the first detection at time t=n in example 200, the object tracker 109 tracks object 201*b* and object 201*e* from the frame at time t=0.

In embodiments, the first set of objects in act 501 could include one or more objects that were detected by a second detection model (e.g., model 120) based on a prior invocation of method 500, and that were tracked by the object tracker 109 into the first frame. In these embodiments of act 501, first set of objects includes a third object that was detected by the second detection model, the first set of objects including the third object based on tracking the third object from a frame (e.g., a fourth frame) preceding the first frame in the video stream.

Method 500 also comprises an act 502 of tracking objects across frames, and an act 503 of identifying a second set of objects in a subsequent frame. In some embodiments, act 502 comprises tracking the first object across a set of frames occurring in the video stream between the first frame and a third frame of the video stream that is different than the first frame and the second frame, and act 503 comprises identifying a second set of objects within the third frame, the second set of objects including the first object based on tracking the first object across a set of frames occurring in the video stream between the first frame and the third frame, the second set of objects including a second definition of the first object using the first attribute and a location of the first object within the third frame. In an example, the object tracker 109 tracks one or more objects across subsequent frames in frame stream 113, such as by tracking object 201*b* from the frame at time t=0 to the frame shown in the first detection at time t=n in example 200, or by tracking at least one object from frame 0 to future frames in timeline 400. In an example, the first object is associated with a tuple that defines an attribute of the detected object (e.g., a class label of "person"), and a location of the detected object within the second frame (e.g., in reference to a center coordinate and bounding box). In embodiments, technical effects of act 502 and act 503 include using an object tracing process that is less computationally-intensive than object detection to carry object detections forward across video frames.

Notably, in embodiments, act 501 to act 503 is a main object detection process that is capable of operating independent of act 504 to act 507 or act 508. Thus, method 500 remains operable even when use of the detection manager 116 is unavailable, such as due to network unavailability, due to constrained computing resources, due to constrained power resources, and the like.

As shown, in embodiments, act 503 may consume eventual results of an act 504 for initiating a redundant detection of objects by a second detection model (and subsequent acts). Thus, in some embodiments, act 503 occurs after initiating an object detection by the second detection model. As a result, the second set of objects identified in act 503 could be affected by having initiated the redundant detection of objects by the second detection model.

Referring now to the redundant object detection and merging process, method 500 also comprises an act 504 of initiating a redundant detection of objects by a second detection model. In some embodiments, act 504 comprises initiating object detection on a second frame of the video stream by a second detection model.

In one example, the first frame is the second frame. In this example, the communicator 110 sends the first frame to the detection manager 116 for a redundant detection of objects within that frame using model 120. Referring to example 200, the communicator 110 sends the frame shown at time t=0 to the detection manager 116. Referring to timeline 400, the communicator 110 sends frame 0 to the detection manager 116. Technical effects of act 504 include initiating an asynchronous and redundant object detection process on a video frame. In other examples, the first frame is different than the second frame. For instance, in one embodiment the second frame precedes the first frame in the video stream, and in another embodiment the second frame is in the set of frames occurring in the video stream between the first frame and the third frame.

In embodiments, the first detection model has a first latency that is at least N frames lower than a second latency of the second detection model (where N is a positive integer) and/or the first detection model has a first detection accuracy that is lower than a second detection accuracy of the second detection model. Thus, in embodiments, the second detection model may produce delayed, but more accurate results, than the first detection model. In embodiments, when the first detection model has a first detection accuracy that is lower than a second detection accuracy of the second detection model, this means that the first detection model may fail to detect an object that is detected by the second detection model, or that the first detection model is less accurate in attribute detection (e.g., class label, pose) than the second detection model.

As shown, there is no particular ordering between act 501 and act 504. Thus, in some embodiments the detection manager 106 identifies objects in the first frame in act 501 prior to sending a frame to the detection manager 116 in act 504 for redundant object detection, while in other embodiments the detection manager 106 identifies objects in the first frame in act 501 after sending a frame to the detection manager 116 in act 504 for redundant object detection.

As mentioned, in some embodiments, device 101 is an edge device, while device 103 is a cloud device. Thus, in some embodiments of act 504, initiating object detection on the second frame by the second detection model comprises submitting the second frame to a remote computer system.

As mentioned, in some embodiments, in addition to sending a video frame to the detection manager 116, the communicator 110 also sends a list of objects that are associated with that frame to the detection manager 116. Thus, in some embodiments, act 504 also comprises submitting a set of detected objects (e.g., the first set of objects, when the first frame is the second frame) to the remote computer system.

Method 500 also comprises an act 505 of identifying a second object. In some embodiments, act 505 comprises, based at least on initiating (i.e., after initiating) object detection on the second frame by the second detection model, identifying a second object within the second frame, the second object being associated with a second attribute and a location of the second object within the second frame. In an example, when the first frame is the second frame, the object detector 117 runs an object detection on the first frame using model 120 resulting in a set of detections for the first frame by the detection manager 116. Referring to example 200, object detector 117 detects objects 201a-201e at time t=k. Referring to timeline 400, object detector 117 runs an asynchronous object detection on frame 0. Technical effects of act 505 include performing an asynchronous object detection on a video frame using a different DNN model than is used by a main object detection process. In other examples, when the first frame is not the second frame, the object detector 117 runs an object detection using model 120 on a frame that precedes the first frame in the video stream, or a frame in the set of frames occurring in the video stream between the first frame and the third frame.

In one example, the second object corresponds to the first object identified in act 501 (e.g., they have substantially similar locations within the first frame, or within a frame in the set of frames occurring in the video stream between the first frame and the third frame). In this example, even though these objects correspond, the second attribute of the second object could be the same as the first attribute of the first object (e.g., model 114 and model 120 classified the object the same way), or the second attribute of the second object could different than the first attribute of the first object (e.g., model 114 and model 120 classified the object differently). In another example, the second object does not correspond to the first object identified in act 501 (e.g., they have substantially different locations within the first frame, or within a frame in the set of frames occurring in the video stream between the first frame and the third frame).

Thus, method 500 also comprises an act 506 of determining if the second object is in the first set. In some embodiments, act 506 comprises determining if the second object corresponds to an object in the first set of objects. In an example, the merging component 111 determines if a location of the second object within the second frame substantially overlaps with the location of the first object within the first frame, or within a frame in the set of frames occurring in the video stream between the first frame and the third frame (e.g., based on having tracked the first object in act 502). Thus, in embodiments, determining if the first object corresponds to the second object comprises determining an amount of overlap between the location of the first object within a frame preceding the second frame and a location of the second object within the frame preceding the second frame. In embodiments, determining an amount of overlap includes determining an amount of overlap between bounding boxes, and amount of overlap between silhouettes, etc. Depending on the outcome of act 506, method 500 comprises either an act 507 of updating an object in the second set (i.e., when the objects do correspond) or an act 508 of fast-tracking the second object to the second set (i.e., when the objects do not correspond).

Notably, depending on the particular arrangement of components within detection manager 106 and detection manager 116, and on whether the communicator 110 sent a list of objects that are known by the detection manager 106 to be associated with that frame to the detection manager 116, act 506 could be performed by the detection manager 106 or by the detection manager 116. Thus, in some embodiments, the computer system (e.g., device 101) determines if the second object corresponds to an object in the first set of objects. In other embodiments, the remote computer system (e.g., device 103) determines if the second object corresponds to an object in the first set of objects.

In some embodiments, act 507 comprises, based at least on determining that the second object corresponds to the first object in the first set of objects, and on the first attribute being different than the second attribute, updating the second definition of the first object to use the second attribute. In an example, when model 120 identifies an object at substantially the same location as it was identified by model 114, but with a different attribute (e.g., class label, pose), the merging component 111 updates a prior attribute of the first object accordingly. In embodiments, when the attribute is a tuple, the merging component 111 merges each element of the tuple separately. Referring to example 200, in embodiments, the merging component 111 updates an object's attribute as it relates to the frame shown at the merged detection of time t=n. Referring to timeline 400, in embodiments, the merging component 111 updates this attribute as it relates to frame 4 (i.e., the current frame at the time that the new attribute became available). Technical effects of act 506 and act 507 include updating a prior object detection—potentially with more accurate data, based on a redundant and asynchronous object detection on a prior video frame.

In some embodiments, act 508 comprises, based at least on determining that the second object differs from any object in the first set of objects, tracking the second object into the third frame, and updating the second set of objects to include a definition of the second object that defines the second object using the second attribute and a location of the second object within the third frame. In an example, when model 120 identifies an object at a location not identified by model 114, the merging component 111 performs a fast-track process (using object tracker 109) to track that object to a current frame. Referring to timeline 400, this fast-track process is shown as tracking the object across frames 0 to 6, and inserting it into current frame 7. Technical effects of act 506 and act 508 include integrating an object detection into a current list of object detections based on a redundant and asynchronous object detection on a prior video frame.

As discussed, the fast-track process may skip frames. Thus, in embodiments, tracking the second object across the set of frames occurring in the video stream between the first frame and the third frame comprises tracking the second object across less than all frames in the set of frames occurring in the video stream between the first frame and the third frame. In some embodiments, a stride of the fast-track process is based on a latency (in terms of frames) of the second model as compared to the first model.

As shown by an arrow between act 503 and the start of method 500, method 500 can repeat any number of times. In these subsequent invocations of method 500 the new first frame occurs at a subsequent location in the video stream.

As mentioned, in embodiments, the detection manager 106 prunes objects based on which model detected them currently and previously. Thus, in some embodiments, method 500 further comprises, based at least on receiving a set of object detections by a particular detection model, pruning one or more objects that were last detected by the particular detection model.

As mentioned, in embodiments, the detection manager 106 tracks a confidence score for objects. Thus, in some embodiments of method 500, the first definition of the first object also uses a first confidence score, and second definition of the first object uses a second confidence score that is lower than the first confidence score based on a decay function and a number of frames in the set of frames occurring in the video stream between the first frame and the third frame. As also mentioned, in embodiments, the detection manager 106 and prunes objects based on decaying their confidence score. Thus, in some embodiments, method 500 also comprises, based on the decay function, pruning the first object at a frame of the video stream that occurs subsequent to the third frame.

Embodiments of the disclosure may comprise or utilize a special-purpose or general-purpose computer system (e.g., device 101, device 103) that includes computer hardware (e.g., hardware 104, hardware 105), such as, for example, one or more processors and system memory, as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. Such embodiments may include a data processing device comprising means for carrying out one or more of the methods described herein; a computer program comprising instructions which, when the program is executed by a computer, cause the computer to carry out one or more of the methods described herein; and/or a computer-readable medium comprising instructions which, when executed by a computer, cause the computer to carry out one or more of the methods described herein. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

The invention claimed is:

1. A computer-implemented method for asynchronously updating object detections within a video stream, the computer-implemented method comprising:
identifying a first set of objects within a first frame of a video stream, the first set of objects including a first object that was detected by a first detection model, the first set of objects including a first definition of the first object using a first attribute and a location of the first object within the first frame;
initiating object detection on a second frame of the video stream by a second detection model;
after initiating object detection on the second frame by the second detection model, identifying a second set of objects within a third frame of the video stream that is different than the first frame and the second frame, the second set of objects including the first object based on tracking the first object across a set of frames occurring in the video stream between the first frame and the third frame, the second set of objects including a second definition of the first object using the first attribute and a location of the first object within the third frame;
based at least on initiating object detection on the second frame by the second detection model, identifying a second object within the second frame, the second object being associated with a second attribute and a location of the second object within the second frame; and
determining if the second object corresponds to an object in the first set of objects, and performing one of:
based at least on determining that the second object corresponds to the first object in the first set of objects, and on the first attribute being different than the second attribute, updating the second definition of the first object to use the second attribute; or
based at least on determining that the second object differs from any object in the first set of objects:
tracking the second object into the third frame, and updating the second set of objects to include a definition of the second object that defines the second object using the second attribute and a location of the second object within the third frame.

2. The computer-implemented method of claim 1, wherein the first set of objects includes the first object based on one of:
initiating object detection on the first frame by the first detection model; or
tracking the first object from a fourth frame preceding the first frame in the video stream.

3. The computer-implemented method of claim 1, wherein the first set of objects includes a third object that was detected by the second detection model, the first set of objects including the third object based on tracking the third object from a fourth frame preceding the first frame in the video stream.

4. The computer-implemented method of claim 1, wherein tracking the second object across the set of frames occurring in the video stream between the first frame and the third frame comprises tracking the second object across less than all frames in the set of frames occurring in the video stream between the first frame and the third frame.

5. The computer-implemented method of claim 1, wherein initiating object detection on the second frame by the second detection model comprises submitting the second frame to a remote computer system.

6. The computer-implemented method of claim 1, wherein the first object corresponds to the second object, and the first attribute is different than the second attribute, and the computer-implemented method comprises updating the second set of objects to include the definition of the second object that defines the second object based at least on using the second attribute.

7. The computer-implemented method of claim 1, wherein the first object differs from the second object, and the computer-implemented method comprises updating the second set of objects to include the definition of the second object.

8. The computer-implemented method of claim 1, further comprising, based at least on receiving a set of object detections by a particular detection model, pruning one or more objects that were last detected by the particular detection model.

9. The computer-implemented method of claim 1, wherein:
- the first definition of the first object also uses a first confidence score,
- the second definition of the first object uses a second confidence score that is lower than the first confidence score based on a decay function and a number of frames in the set of frames occurring in the video stream between the first frame and the third frame, and
- based on the decay function, the computer-implemented method further comprises pruning the first object at a frame of the video stream that occurs subsequent to the third frame.

10. The computer-implemented method of claim 1, wherein:
- the first attribute defines at least one of: a pose or a class label; and
- the location of the first object within the first frame defines at least one of: a bounding box surrounding the first object or a silhouette of first object.

11. The computer-implemented method of claim 1, wherein the first detection model has at least one of:
- a first latency that is at least N frames lower than a second latency of the second detection model, where N is a positive integer; or
- a first detection accuracy that is lower than a second detection accuracy of the second detection model.

12. The computer-implemented method of claim 1, wherein determining if the first object corresponds to the second object comprises determining an amount of overlap between the location of the first object within a frame preceding the second frame, and a location of the second object within the frame preceding the second frame.

13. The computer-implemented method of claim 1, wherein the first frame is the second frame.

14. The computer-implemented method of claim 1, wherein the first frame is different than the second frame, and wherein the second frame is in the set of frames occurring in the video stream between the first frame and the third frame.

15. The computer-implemented method of claim 1, wherein the first frame is different than the second frame, and wherein the second frame precedes the first frame in the video stream.

* * * * *